May 31, 1938.  C. D. STEWART  2,118,905
GROUND TESTING INSTRUMENT
Filed Dec. 17, 1936
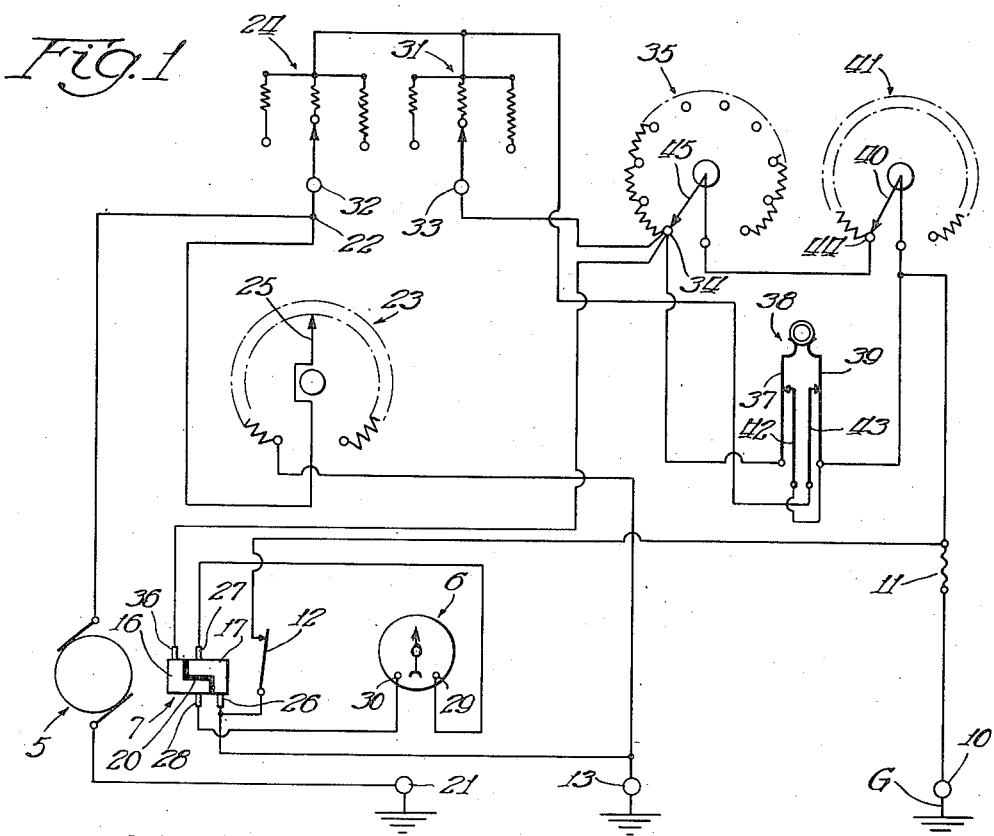
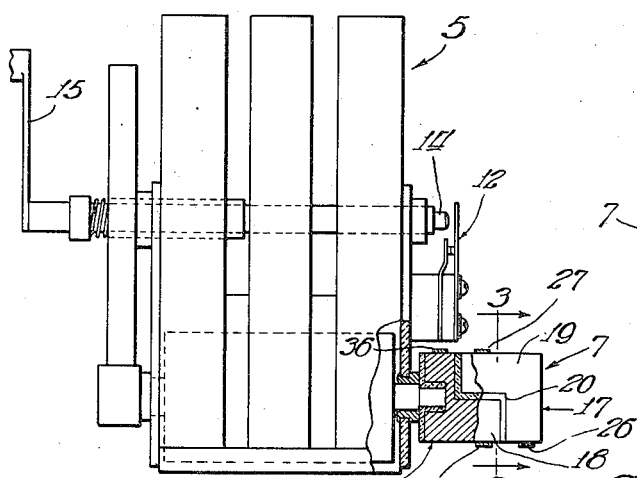
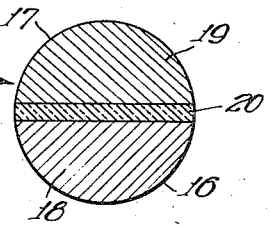
Inventor:
Christopher D. Stewart
By: Zabel Carlson & Wells
Attys Patented May 31, 1938

2,118,905

UNITED STATES PATENT OFFICE 2,118,905

GROUND TESTING INSTRUMENT

Christopher D. Stewart, Ottawa, Ill., assignor to Edward S. Stewart and Christopher D. Stewart, Ottawa, Ill., partners, doing business as Stewart Brothers Application December 17, 1936, Serial No. 116,315

5 Claims. (Cl. 175—183)

This invention relates to testing devices and more particularly to devices for measuring ground resistances.

It is the principal purpose of this invention to provide a device of this character wherein an alternating current source may be used with a visible zero current indicator and a bridge circuit to obtain a quick direct reading from the instrument without any calculations whatsoever.

The invention is particularly applicable for ground testing purposes because of the fact that earth currents, which destroy the balance where direct current is used, do not affect this instrument adversely.

The device also is particularly useful in this type of work because of the fact that it does not depend upon loss of tone or loss of noise to arrive at a balance as in the case of instruments utilizing a receiver.

The features and advantages of the invention will appear more clearly from the following description reference being had to the accompanying drawing wherein a preferred embodiment is shown. It is to be understood, however, that the drawing and description are illustrative only and are not to be taken as limiting the invention except in so far as it is limited by the claims.

In the drawing—

Fig. 1 is a wiring diagram illustrating the electrical connection device;

Fig. 2 is a view in side elevation partly in section of the generator unit used to supply alternating current for testing purposes;

Fig. 3 is an enlarged section on the line 3—3 of Fig. 2.

Referring now to the drawing, the invention is embodied in a testing instrument which includes a hand generator 5 and a visible zero current indicator 6 which are connected through a commutator device 7 in such a fashion that the indicator 6 may be a direct current type of indicator even though the source of potential is an alternating current generator. The indicator 6 is a D-Arsonval galvanometer which is particularly desirable because it is sensitive and dead beat. The inertia of the galvanometer itself is such that stray static and high frequency discharges do not deflect the needle. This type of indicator also reads in both directions, that is, if the current flows in one direction through the indicator, the needle is deflected in one direction from a center zero point; and, if the current flows in the opposite direction, the needle is deflected on the other side of the center zero point.

This feature is of value because, when adjusting for a balance, too much resistance in the rheostat causes the pointer to move in one direction whereas not enough causes it to move in the other direction. Therefore, when adjusting for a balance, the indicator not only shows where there is no balance, but which way the rheostat must be turned to get a balance even though the current source is alternating.

The instrument, as shown, is being used to measure an unknown ground resistance G which is connected to the instrument by a single lead from an electrode 10. A fuse 11 is inserted in this line for a purpose which will presently appear. The lead from the ground G goes directly to a switch 12 which, until the generator is in operation, is normally closed so as to connect ground G to an exploring electrode 13 and establish a direct short circuit. The reason for connecting the ground G and exploring electrode 13 by short circuit leads through the switch 12 is to prevent damage to the instrument in case of an unexpectedly high voltage on the ground G. The switch 12 is mounted on the generator 5 and is adapted to be opened when the generator is started by means of a shaft 14 of the generator, this shaft being the shaft that is driven by the handle 15 of the generator. The mechanical structure by which the shaft 14 is caused to move endwise and open the switch 12 may be any suitable mechanism such for example as that shown and described in the Kaisling Patent 785,499.

The hand generator 5 carries the commutator device 7 which is so arranged as to reverse the leads to the galvanometer 6 at the same instant the current reverses in the generator. Thus, although the generator is producing alternating current and feeding it to the instrument, this current, when it is transmitted to the galvanometer, is a pulsating direct current. The commutator consists of a pair of conducting blocks 16 and 17 each of which has a cylindrical portion and a semi-cylindrical portion, the semi-cylindrical portions being indicated at 18 and 19. The blocks 16 and 17 are separated electrically by insulation 20.

Referring now to the bridge circuit connections, one side of the generator 5 is grounded through an electrode 21, and the other side of the generator is connected to a point 22 between a variable rheostat 23 and a bank 24 of fixed resistances. The generator is connected to the movable contact 25 of the rheostat 23, and one end of this rheostat is connected directly to the ground electrode 13. As an example of the value of the rheostat 23, it may desirably have a total resistance of 400 ohms. It will be noted that the electrode 13 is also connected directly to the block 17 of the commutator by a brush 26.

Thus current from the generator may flow from the point 22 through the rheostat 23 to the electrode 13, and from the electrode 13 connection is made whereby the potential at this point is communicated to the galvanometer 6 through the brush 26 and block 17. The side of the galvanometer to which this potential will be communicated depends upon whether the brush 27 or brush 28 is in contact with the block 17. The brushes 27 and 28 are connected by suitable leads to the opposite terminals 29 and 30 of the galvanometer 6. As shown in Fig. 1, the brush 27 is in engagement with block 17, but, as the commutator turns, it will bring the block 16 into engagement with the brush 27 at the time the current reverses in the generator 5.

The resistance bank 24 is connected to a second resistance bank 31. A pair of switch arms 32 and 33 connected to a common shaft are adapted to select the particular resistances in the banks 24 and 31 that are to be used. The switch arm 33 is connected to a zero point 34 of a rheostat 35, and from this point a lead connects to a brush 36 in engagement with the block 16 of the commutator 7. The zero point 34 of the rheostat 35 is also connected to one spring arm 37 of a cam lever type switch 38. The other spring 39 of the switch 38 is connected directly to a moving contact 40 of a rheostat 41 and to the ground G through the fuse 11. Contact 42 of the switch 38 is tied directly to the contact 39 while contact 43 of the switch 38 is connected to the resistance bank 31 and the resistance bank 24. The zero point 44 of the rheostat 41 is connected to a movable contact 45 of the rheostat 35.

As an example of the values employed in the various resistances and rheostats, the resistance banks 24 and 31 may desirably be made up of 3 resistances each, the left hand resistance being the low resistance of 2 ohms, the middle resistance being 10 ohms, and the right hand resistance being 400 ohms. The rheostat 35 may desirably be divided into steps of 100 ohms each, there being nine 100 ohm resistances connected in series. The total resistance of the rheostat 41 is 100 ohms.

The manner in which the device is used in measuring the resistance of an unknown ground G is substantially as follows: The instrument is connected up substantially as shown in Fig. 1 so that the galvanometer 6 is connected across the points 34 and 13 with the commutator 7 interposed between the galvanometer and the points 34 and 13 so that the alternating current imposed upon the circuit by the generator 5 will be fed to the galvanometer 6 as a pulsating direct current. The arrangement, as shown in Fig. 1, of the various resistances and the ground G and electrodes 13 and 21 is such as to form a Wheatstone bridge in which the resistance 24, the ground resistance of the ground G plus the ground resistance at electrode 21 constitute one side of the bridge. The other side of the bridge consists of that part of the rheostat 23 which is placed in circuit plus the ground resistance at electrode 13 and the ground resistance at electrode 21.

Now in order to obtain a balance of the galvanometer 6, it is necessary to adjust the pointer 25 of the rheostat 23 until the resistance of this rheostat that is included bears the same ratio to the resistance element of bank 24, that the resistance at electrode 13 bears to the ground G. The pointer 25 may be adjusted to any desired point to obtain the balance and then is left in position while the second or direct reading is made of the resistance of the unknown ground G. In making this second reading, the switch 38 is operated to break contact between the springs 37 and 39 and their respective contact members 42 and 43.

This changes the Wheatstone bridge arrangement so that now the two sections of the bridge are as follows: One side of the bridge extends from the generator 5 through the resistance bank 24 and through the corresponding resistance element of the bank 31, then to the rheostat 41, and through the unknown ground G back to electrode 21, and from there to the other side of the generator 5. The other side of the Wheatstone bridge extends through that portion of the rheostat 23 that was left in circuit to electrode 13 to ground and back through electrode 21 to the other side of the generator 5.

The ratio between that portion of the rheostat 23 left in circuit and the corresponding leg of the other side of the Wheatstone bridge has been changed by doubling the amount of resistance in the other side. That is to say, by including a resistance element of the bank 31 in series with the resistance element of the bank 24, the ratio of the total resistance now included by means of the bank 24 and 31 to the resistance of that portion of the rheostat 23 which was left in circuit has been doubled. Therefore, in order to balance the bridge once more, it is necessary to double the resistance between the point 34 and the ground through the ground G. This is accomplished by moving the pointer 40 of the rheostat 41 until the necessary amount of resistance has been added to again balance the bridge so that no current is shown through the galvanometer 6 between the electrode 13 and the point 34. Mathematically, this amount must equal the ground resistance G.

In some instances, it may be found that the rheostat 41 is not of a sufficiently high resistance to enable the operator to balance the circuit. When a condition of this sort is reached, movement of the pointer 45 to include one or more sections of the rheostat 35 results in adding additional resistance to the resistance of the rheostat 41 in that particular section of the bridge. In order that the readings may be comparatively accurate, it is obvious, of course, that any one of the three or more resistances in the banks 24 and 31 may be used as desired. Thus the system is sufficiently flexible with respect to resistance ranges to adapt it to any normal expected use of the instrument.

The combination described herein is of particular advantage in the testing of grounds since it enables one to use an alternating current source of electricity to eliminate any disturbances or errors caused by earth currents. Furthermore, since the instrument is short circuited in so far as the unknown ground connection is concerned and the short circuit is protected by a fuse 11, it avoids any damage to the instrument in case of connection to a hot ground wire. This short circuit arrangement also prevents any initial deflection of the galvanometer upon connection being made to the ground to be measured that might otherwise disturb the operator and confuse his measurements. The instrument is not effective when used with alternating current for the measurement of any resistance but noninductive resistance. However, it may be used for the measurement of inductive resistances by using direct current in place of the generator 5 and omitting the commutator 7.

The flexibility of the instrument with respect to the rheostats used makes it unnecessary to read the actual resistance, for example of the rheostat 41. This rheostat may be calibrated in steps of 1 to 100. Then, if the actual resistance of this rheostat is 100 ohms, the second bank 31 of fixed resistances must duplicate the first bank 24. However, if the rheostat 41 is calibrated for a different ratio such for example that an actual inclusion of 100 ohms of the rheostat 41 in circuit indicates actually only 50 ohms on the rheostat dial, then the second bank of resistance 31 must bear the same relation to the first bank of resistances 24 as the actual resistance of rheostat 41 bears to the indicating reading. The difficulty of obtaining uniformly accurate variable resistors and matching them with a scale is avoided by this system. In making the resistances, the actual resistance from zero to maximum scale reading of the scale employed of the rheostat 41 is measured. This may be 100 ohms as indicated by the scale or it may be some other amount. Assuming for example that such measured resistance is 105 ohms, then the fixed resistances in bank 31, which may readily be accurately made, are made to bear the same ratio to the corresponding resistance in bank 24 as 105 bears to 100, the scale reading, and the resistance steps of rheostat at 35 should be the same as the actual resistance of rheostat 41.

From the above description, it is believed that the construction and operation of this device will be readily apparent to those skilled in this art. It is also believed to be obvious that various modifications may be made from the exact details shown and described without departing from the scope of the invention as it is defined in the claims.

Having thus described one specific form of the invention, what I claim as new and desire to secure by Letters Patent is:

1. A testing instrument of the character described, comprising in combination an alternating current generator, a commutator driven by said generator, a direct current galvanometer connected across the output terminals of said commutator, three terminals adapted to be connected to ground, one of said terminals being connected to one output terminal of said generator, means connecting the other two terminals across the input side of said commutator, a fixed resistance, a variable resistance, circuit connections connecting said ground terminals and resistances in a Wheatstone bridge arrangement with said fixed resistance as one arm of the bridge having one end connected to the ungrounded side of the generator and the other end connected to one input terminal of the commutator, the ground resistance between the ground terminal connected to the generator and one of the other ground terminals being connected in series with said fixed resistance at the commutator end thereof, a portion of said variable resistance being connected in parallel with the fixed resistance between the ungrounded terminal of said generator and the other input side of the commutator, the ground resistance between the ground terminal connected to the generator and the third ground terminal being connected in series with the variable resistance whereby to complete the bridge.

2. A testing instrument of the character described, comprising in combination an alternating current generator, a commutator driven by said generator, a direct current galvanometer connected across the output terminals of said commutator, three terminals adapted to be connected to ground, one of said terminals being connected to one output terminal of said generator, means connecting the other two terminals across the input side of said commutator, a fixed resistance, a variable resistance, circuit connections connecting said ground terminals and resistances in a Wheatstone bridge arrangement with said fixed resistance as one arm of the bridge having one end connected to the ungrounded side of the generator and the other end connected to one input terminal of the commutator, the ground resistance between the ground terminal connected to the generator and one of the other ground terminals being connected in series with said fixed resistance at the commutator end thereof, a portion of said variable resistance being connected in parallel with the fixed resistance between the ungrounded terminal of said generator and the other input side of the commutator, the ground resistance between the ground terminal connected to the generator and the third ground terminal being connected in series with the variable resistance whereby to complete the bridge, a second fixed resistance, a second variable resistance having an indicating scale, the second resistance having the same ratio to the first fixed resistance that the second variable resistance has to its scale reading, and switching means operable to insert said second fixed resistance in series with the first fixed resistance and the second variable resistance in series with the first named ground resistance.

3. A testing instrument of the character described, comprising in combination an alternating current generator, a commutator driven by said generator, a direct current galvanometer connected across the output terminals of said commutator, three terminals adapted to be connected to ground, one of said terminals being connected to one output terminal of said generator, means connecting the other two terminals across the input side of said commutator, a fixed resistance, a variable resistance, circuit connections connecting said ground terminals and resistances in a Wheatstone bridge arrangement with said fixed resistance as one arm of the bridge having one end connected to the ungrounded side of the generator and the other end connected to one input terminal of the commutator, the ground resistance between the ground terminal connected to the generator and one of the other ground terminals being connected in series with said fixed resistance at the commutator end thereof, a portion of said variable resistance being connected in parallel with the fixed resistance between the ungrounded terminal of said generator and the other input side of the commutator, the ground resistance between the ground terminal connected to the generator and the third ground terminal being connected in series with the variable resistance whereby to complete the bridge, a circuit connecting the ground terminals that are connected across the input side of the commutator, a switch in said circuit and means operable by starting said generator to open said switch.

4. A testing instrument of the character described, comprising in combination an alternating current generator, a commutator driven by said generator, a direct current galvanometer connected across the output terminals of said commutator, three terminals adapted to be connected to ground, one of said terminals being connected to one output terminal of said generator, means connecting the other two terminals across the input side of said commutator, a fixed resistance, a variable resistance, circuit connections connecting said ground terminals and resistances in a Wheatstone bridge arrangement with said fixed resistance as one arm of the bridge having one end connected to the ungrounded side of the generator and the other end connected to one input terminal of the commutator, the ground resistance between the ground terminal connected to the generator and one of the other ground terminals being connected in series with said fixed resistance at the commutator end thereof, a portion of said variable resistance being connected in parallel with the fixed reing current generator, a commutator driven by said generator, a direct current galvanometer connected across the output terminals of said commutator, three terminals adapted to be connected to ground, one of said terminals being connected to one output terminal of said generator, means connecting the other two terminals across the input side of said commutator, a fixed resistance, a variable resistance, circuit connections connecting said ground terminals and resistances in a Wheatstone bridge arrangement with said fixed resistance as one arm of the bridge having one end connected to the ungrounded side of the generator and the other end connected to one input terminal of the commutator, the ground resistance between the ground terminal connected to the generator and one of the other ground terminals being connected in series with said fixed resistance at the commutator end thereof, a portion of said variable resistance being connected in parallel with the fixed resistance between the ungrounded ter-